United States Patent [19] [11] Patent Number: 5,015,933
Watkins et al. [45] Date of Patent: May 14, 1991

[54] SEAT BASE MOTION CONTROLLER

[75] Inventors: William M. Watkins, Covina; David L. Toyne, Monrovia; Alan J. Arena, Chino, all of Calif.; Larry D. Lawver, Orlando; Daniel S. Birket, Opopka, both of Fla.

[73] Assignee: Ridewerks, Ltd., Burbank, Calif.

[21] Appl. No.: 437,344

[22] Filed: Nov. 15, 1989

[51] Int. Cl.⁵ .............................................. A63G 31/16
[52] U.S. Cl. ..................................... 318/567; 352/85; 272/18
[58] Field of Search ..................... 318/560, 567, 568.1, 318/568.16, 568.17, 568.18, 568.24, 568.25; 352/85; 272/1 R, 8 R, 16, 17, 18, 85, 86; 128/83; 297/350

[56] References Cited

U.S. PATENT DOCUMENTS

| | | | |
|---|---|---|---|
| 3,628,829 | 12/1971 | Heiling | 272/16 |
| 3,826,250 | 7/1974 | Adams | 128/33 X |
| 3,923,300 | 12/1975 | Tanus | 272/18 |
| 4,066,256 | 1/1978 | Trumbull | 272/18 |
| 4,232,661 | 11/1980 | Christensen | 128/33 |
| 4,710,129 | 12/1987 | Newman et al. | 272/18 X |
| 4,752,065 | 6/1988 | Trunbull et al. | 272/18 |
| 4,879,849 | 11/1989 | Hollingsworth et al. | 272/18 X |

Primary Examiner—Bentsu Ro
Attorney, Agent, or Firm—Christie, Parker & Hale

[57] ABSTRACT

The Seat Base Motion Controller provides automated control of seat motion for seat systems employed in providing combined visual and motion experience for patrons in amusement rides and the like. Occupant safety features are integrated within the seat motion control system and centralized control of multiple motion bases is accomplished. Motion control of the seat bases is responsive to a position signal input coordinated with a visual presentation viewed by the patrons. Self contained power systems for the actuation means of the seat base allows sizing of an entertainment threater to accommodate anticipated audiences. Independent control and operation of each motion base precludes the need for shutting down the entire theater if a fault exists in one motion base or the safety systems on that motion base are activated.

14 Claims, 11 Drawing Sheets

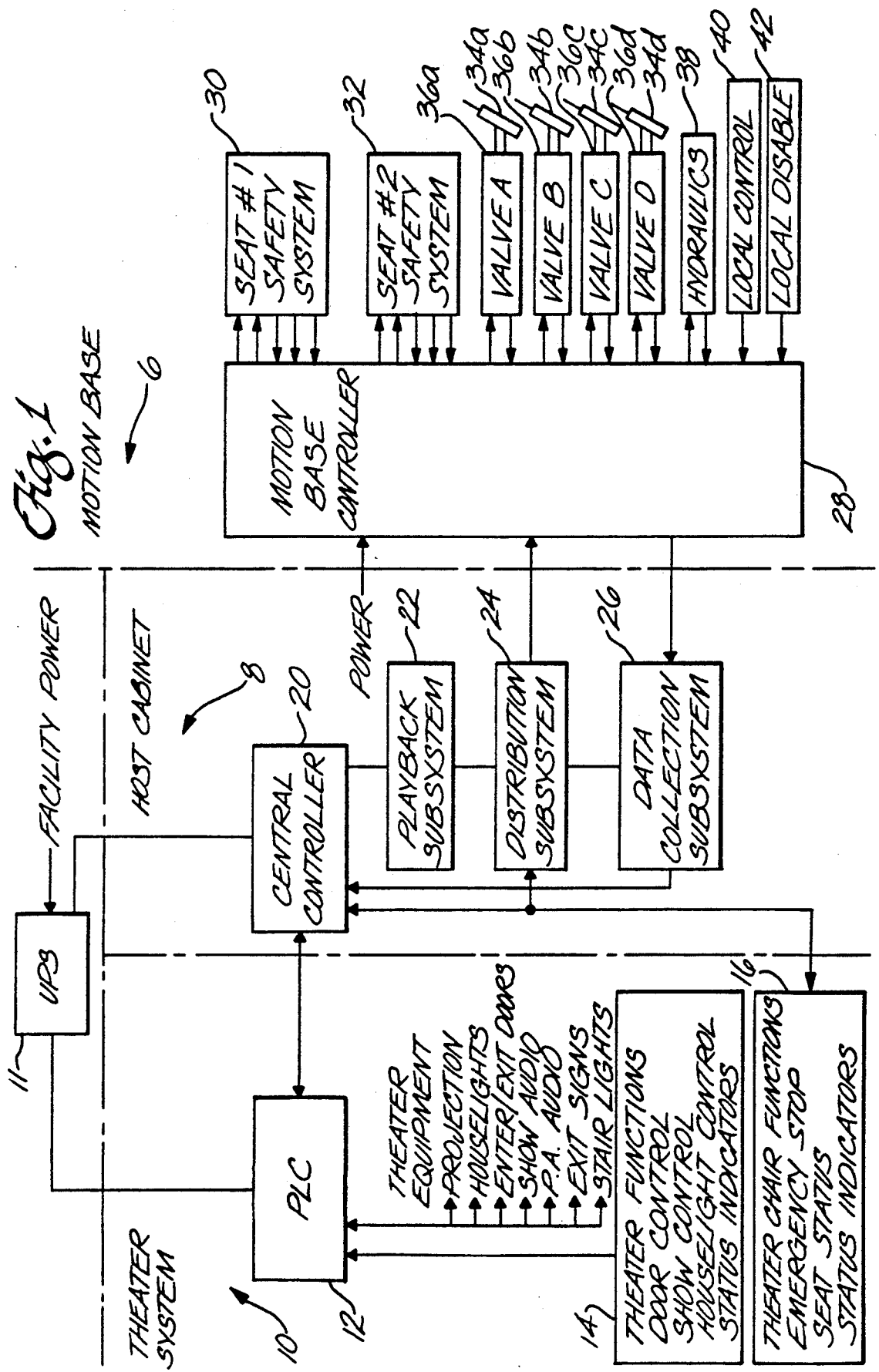

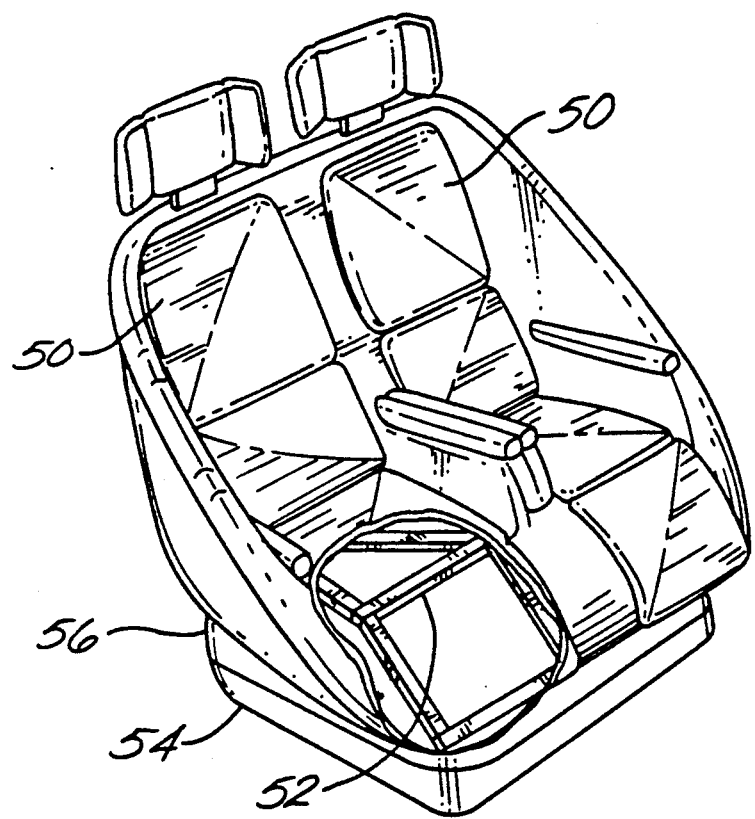

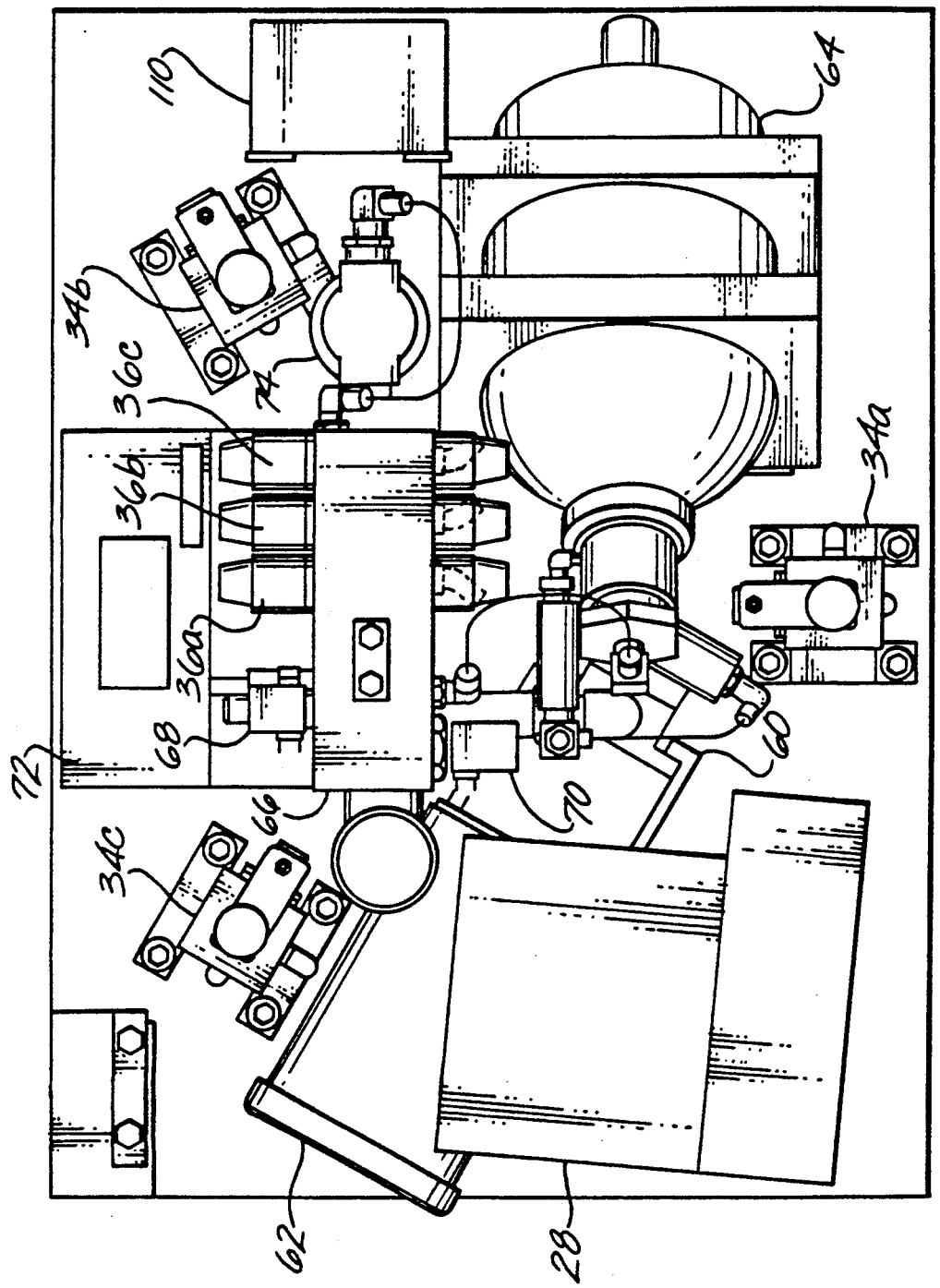

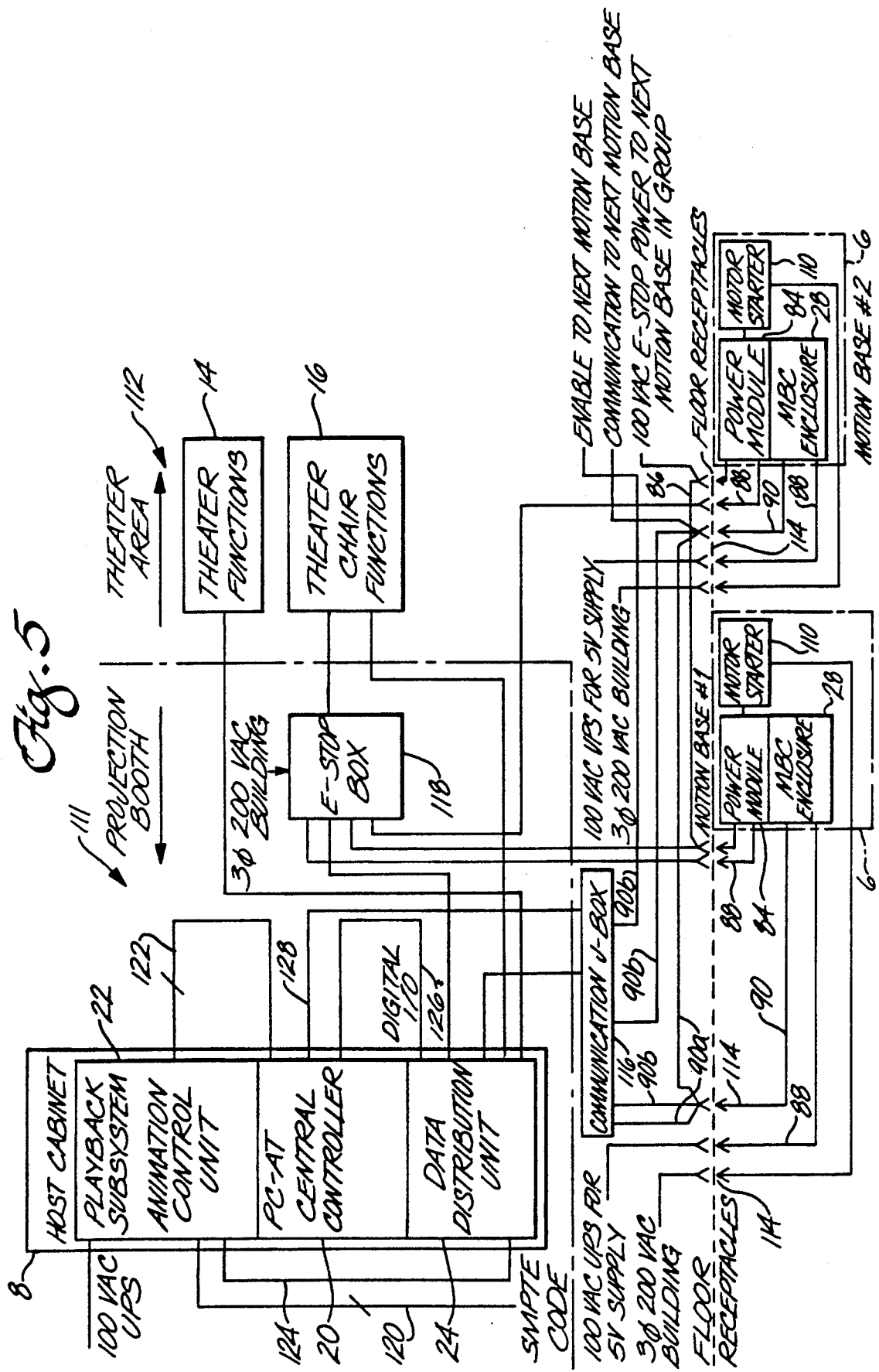

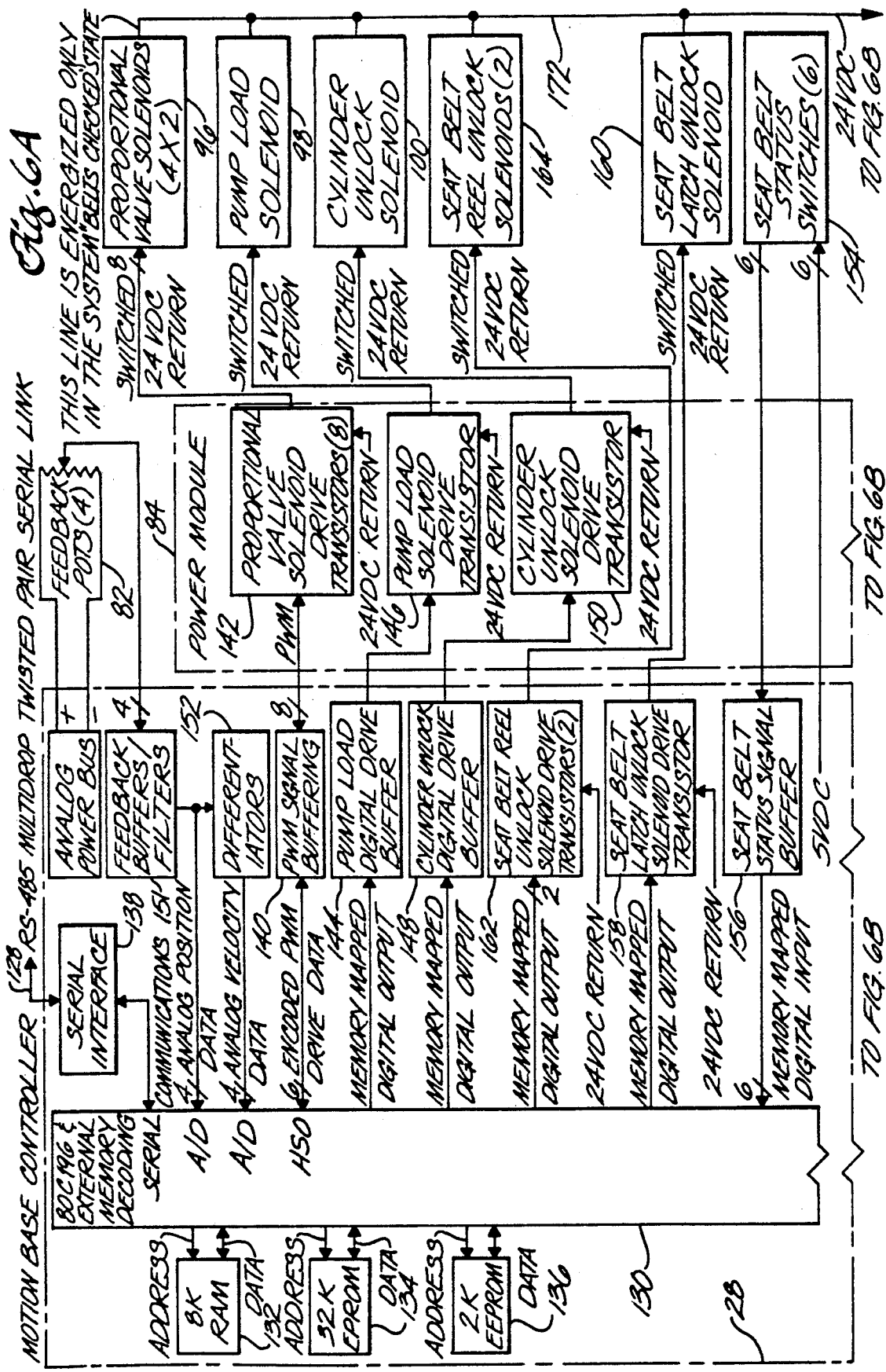

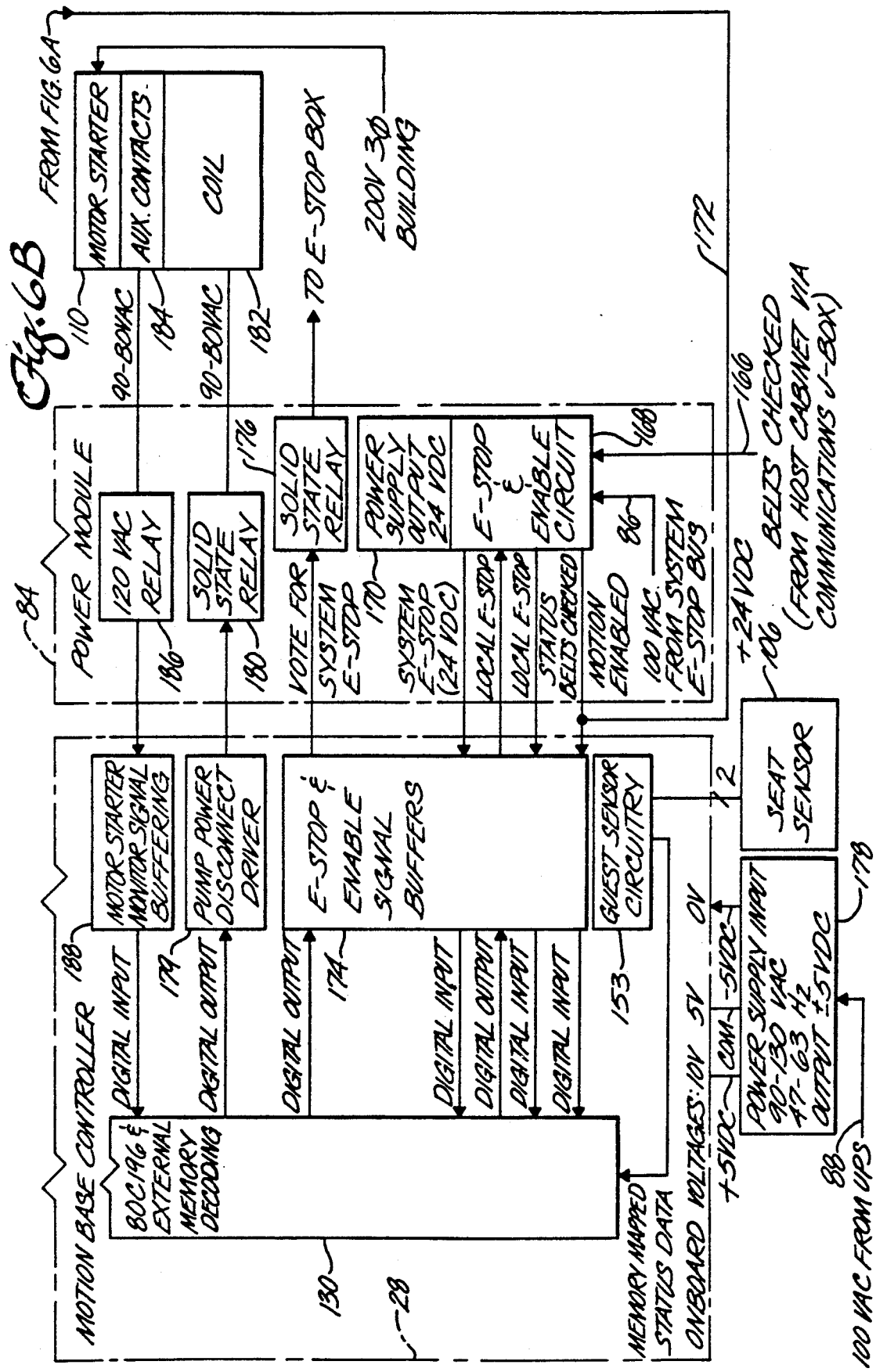

MOTION CONTROL ALGORITHM

SEAT BASE MOTION CONTROLLER

FIELD OF THE INVENTION

The present invention relates in general to motion control of a seat corresponding to a visual presentation for heightened realism by providing the experience of physical motion as well as visual input for entertainment or simulation. In particular, the invention provides for automated control of seat motion while employing occupant safety features and centralized control of multiple motion bases.

BACKGROUND OF THE INVENTION

Amusement parks and other entertainment industries are continually attempting to provide the greatest excitement and realism in their entertainment offerings while maintaining minimum cost, user safety, and operator flexibility. Motion pictures have been developed to the extent that great realism may be captured and provided for audience entertainment presenting the visual appearance of roller coaster rides, flying, hang gliding, surfing, and other exciting but potentially dangerous or expensive activities. However, the lack of any physical motion in a purely visual experience does not stimulate the viewer's other senses.

Similarly, amusement park rides have been developed which provide great physical stimulation such as the various roller coasters, ferris wheels and other spinning, rotating, tracked or free-falling devices. The cost of such amusements is significant in that enormous expenditures for structural design, mechanical devices and real estate are required to set up and run such rides. Further, the visual experience is often far from stimulating in and of itself due to the limitations of the immediate scenery and the physical constraints of the ride to accommodate numerous patrons.

A combined motion and visual experience which may be readily adapted to simulate various physical experiences such as those described above provides a cost-effective approach for entertainment operators. Physical experiences which cannot be duplicated in amusement park rides and which lose in excitement with only visual presentation may be provided to the audience. Early examples of attempts to create combined motion and visual experience are represented by devices such as that disclosed in U.S. Pat. No. 2,861,806 for a rocket ship amusement apparatus which was invented by W. E. Disney and was ultimately installed in one embodiment in the famous Disneyland Amusement Park. A visual experience was provided to the patrons on multiple viewing screens to simulate the view from a rocket ship. Limited physical sensation was provided by actuators creating vibration under the patrons' seats. Since the range and type of motion in this device were extremely limited, the effect of the simulation while different and exciting in its time was not particularly realistic.

Similar combinations of motion and visual technology have been employed in various simulators in training roles. U.S. Pat. No. 3,486,242 to M. Aronson for an assault boat coxswain trainer is an example of such a simulator. A physical layout approximating the appearance of a coxswain station on an assault boat was coupled to actuation systems providing limited motion simulating waves, wind and currents as well as motor vibration and control sensations while a visual image to simulate motion of the device was presented on a screen in front of the model coxswain station. Similar simulators have been designed and employed for aircraft cockpit training, training of supertanker captains and pilots, and other instances where operation of the actual devices may be expensive and simulation of emergencies or other faults may be safely conducted while providing significant realism in the training.

More recent examples of entertainment applications of combined visual and motion experience are disclosed in U.S. Pat. Nos. 4,066,256 and 4,798,376 to Trumbull. These devices employ actuation systems which provide motion about multiple axes to seats for a plurality of patrons in combination with a visual display. The motion actuation is coupled to the visual display through a control system to provide the greatest possible realism. Each of these prior art systems requires relatively massive actuation systems with commensurately high power requirements and mechanical complexity to accommodate a large number of patrons. In addition, as greater realism is provided by allowing a greater range of motion and acceleration in actuators, safety of the patrons becomes a concern. Control of entry and exit into the seats and restraint of patrons during motion in a combined visual/motion experience is required to prevent potential injury.

To reduce operating costs, it is desirable that an entertainment theater providing a visual/motion experience be able to accommodate a varying number of patrons during peak and off-peak periods. Efficiency of operation of the actuation and control system to provide minimum cost to the operator is required. The devices in the prior art do not provide the combination of realism in a visual and motion experience, patron safety and cost-effective operation required for future development in this burgeoning entertainment area.

SUMMARY OF THE INVENTION

The present invention improves over the prior art by providing individual motion-base controllers for one or more seats to achieve the physical portion of the motion/visual experience.

The present invention is adapted for integration into a theater environment. The systems typically associated with a theater including projection equipment, entrance and exit for the audience, house lights, audio system, and other associated functions, are provided. A plurality of motion bases supporting at least one seat for a patron replace the normal seats present in the theater. In the embodiments shown in the present application, seats for two occupants are present on each motion base. Each motion base contains a plurality of actuators to impart motion about multiple axes to the seats. Each seat incorporates a safety system which senses the presence of a patron in the seat and provides safety restraint for the patron. The safety restraint comprises a seat belt system including means for indicating that the belt is fastened, means preventing unfastening of the seat belt during operation of the motion base and means for maintaining tension on the seat belt to avoid inadvertent loosening of the belt during the operation of the motion base.

A control means in the motion base responsive to a motion control signal commands movement or positioning of the actuation means and receives position information from a position indicator included in the actuation means for feedback to accomplish closed loop position control through sensing of the input signal and actual position.

A central control system in communication with the plurality of motion bases provides the position signal input to the motion bases in coordination with the visual presentation from the projection system. Communication from the motion bases to the central controller allows verification of status of the patron safety systems on each motion base and appropriate automatic control to terminate movement of the motion bases if an unsafe condition exists. The central controller provides monitoring information to a control console for the theater system operator for information on status of the motion bases including the safety systems. Manual controls for the operator to stop movement of the motion bases in an emergency condition and to provide operator verification of seat safety systems prior to automatic sequencing by the central controller are also provided.

The operator control console may also incorporate control of the various theater functions including the projection system, house lights and audio.

Active local control of each motion base by the motion base controller allows local deactivation of a motion base without affecting the other motion bases. Such deactivation may be manually accomplished if a maintenance problem or other serviceability difficulty exists with a motion base or may be automatically employed if no patrons are present on the motion base, thus saving energy and avoiding unnecessary wear on the mechanical components of the system.

Each motion base include a self-contained power system for the actuation means. This allows great flexibility as to placement of individual motion bases and allows sizing of the theater to accommodate the anticipated audience. In the present invention, additional motion bases are provided in the system by running electrical power and communications cabling from the central controller to the desired placement location. Independent control and operation of each motion base further precludes the need for shutting down the entire theater if a fault exists in one motion base.

These and additional features of the present invention are described in greater detail in the following drawing, detailed description, and the appended claims.

DESCRIPTION OF THE DRAWINGS

FIG. 1 is a block diagram of the elements of the invention incorporated with a theater system;

FIG. 2a is a pictorial view of a motion base incorporating seats for two patrons;

FIG. 2b is a top view of a present embodiment of the motion base showing mechanical/hydraulic component arrangement;

FIG. 5 is a functional block diagram of the elements of the central control system and the motion base power systems; and FIG. 6a is a functional block diagram of the motion base controller.

FIG. 6b is a continuation of the functional block diagram of FIG. 6a.

DETAILED DESCRIPTION OF THE INVENTION

Figure 3:
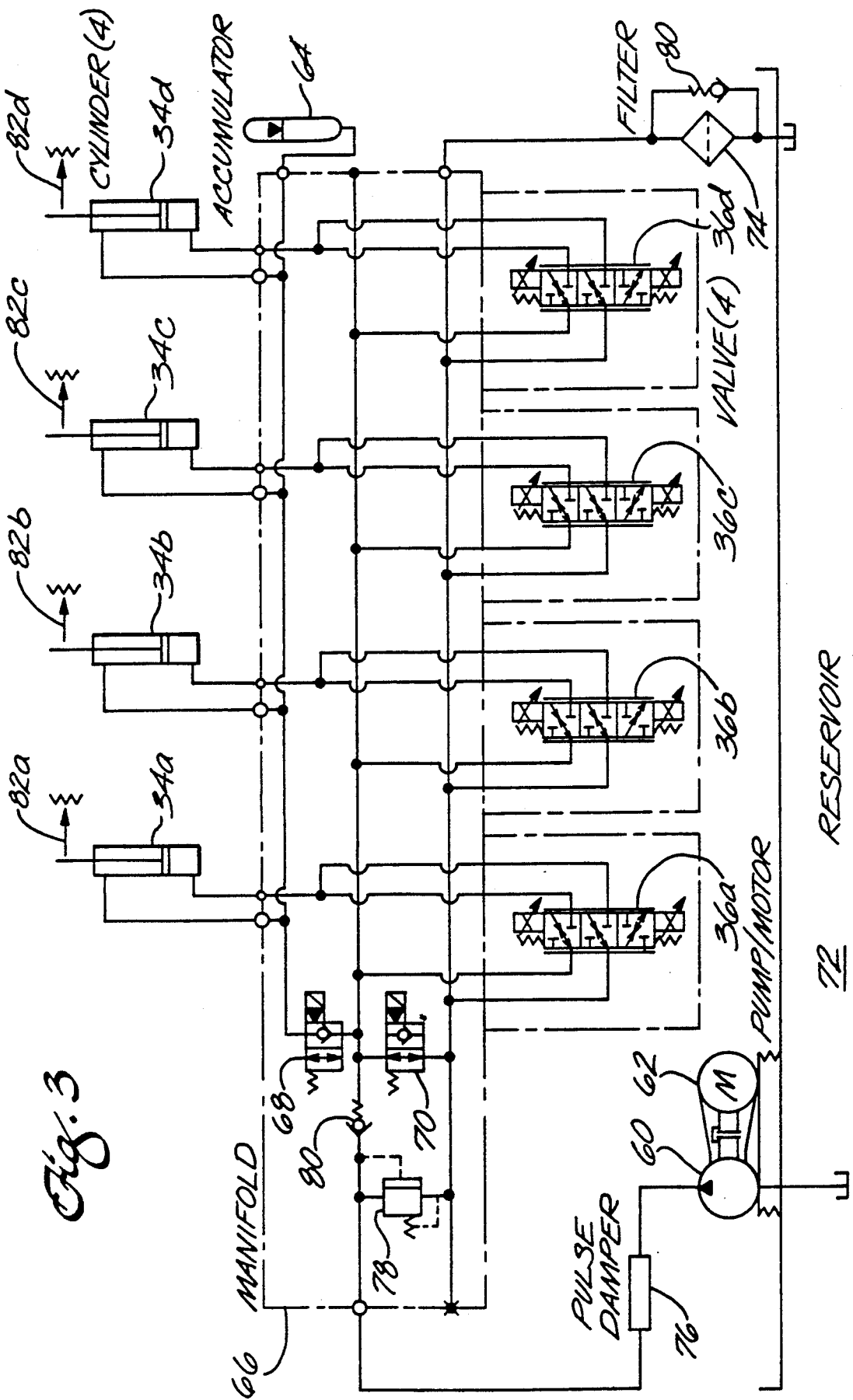
FIG. 3 is a schematic of the hydraulic system in one embodiment of the motion base of the present invention.

Referring now to FIG. 1, an embodiment of the invention integrated into a theater environment is shown. The major elements of the present invention include a motion base 6 and a host cabinet 8 to be described in greater detail subsequently, integrated with a theater system 10. The theater system 10 contains all of the standard elements of a theater. A projection system for providing a visual presentation to the audience on a screen and the associated control of the projection system is included in the theater system. A show audio system which provides sound accompanying the visual presentation is also present. The physical features of the theater including the house lights, entry and exit doors, exit signs, stair lights and a public address audio system are also provided. Appropriate automatic control for opening and closing exit doors, dimming the house and stair lights, addressing the audience with instructions through the public address audio system and initiation of the projection of video images and associated show audio may be provided as known in the prior art.

In the embodiment shown, integrated control of the theater functions is provided through a programmable logic controller 12 responsive to a theater functions control console 14. The theater functions control console incorporates manual switches for door control and house light control. Controls are provided for automatic sequencing of the entire show as will be described in greater detail subsequently, and various status indicators are provided to allow the operator to monitor the theater functions. Those skilled in the art will recognize that the functions provided by the programmable logic controller and the manual controls and displays of the operator consoles may be incorporated as individual hardware components including switches, indicators such as labeled LEDs and dedicated logic control circuits, or a computer hardware and software system employing standard microcomputer technology with keyboard input and screen display as an output for the various status indicators.

As a portion of the theater function console or as a separate operator console, a theater chair functions unit 16 allows the operator to control the elements of the present invention. An EMERGENCY STOP is provided to allow the operator to manually cause all motion in the elements of the present invention, to be discontinued. Status indicators for the various elements of the present invention as will be described in greater detail subsequently, are provided for the operator and manual controls verifying status of the elements of the invention designated SEAT STATUS are provided to supplement the automatic control functions of the present invention.

The elements of the theater system communicate with a host cabinet 8 which contains a central controller 20. The central controller communicates with the programmable logic controller of the theater system. A motion playback subsystem 22 is activated by the central controller to coordinate motion control signals with the projected visual and audio presentations of the theater system. A distribution subsystem 24 communicates the motion control information to the individual motion bases.

A data collection subsystem 26 receives status information from each motion base which is provided to the central controller. Communications between the central controller and the theater chair functions portion of the operator console provides the path for the manual control functions exercisable by the operator and the indication of status of the motion bases.

Each motion base includes a motion base controller 28 which communicates with the distribution subsystem and executes the autonomous functions of each motion base. In the present embodiment, seats for two patrons are provided on each motion base. A safety system 30 for seat number 1 and a safety system 32 for seat number 2 communicate with the motion base controller. Actuators 34a through 34d are controlled by the motion base controller through valves 36a through 36d. In the present embodiment the actuators are powered through a hydraulic system which will be described in greater detail subsequently. Various sensors and controls in the hydraulic system 38 communicate with the motion base controller. For maintenance purposes, a local control panel 40 is interfaced to the motion base controller. A local disable control 42 is also attached to the motion base controller to allow an individual motion base to be disabled without affecting the operation of other motion bases in the system.

The appearance of the individual motion base is best seen in FIG. 2a. In the embodiment shown, seats 50 are provided for two patrons. A frame 52 supports the seats and provides connection for the actuators which will be described in greater detail subsequently. A base plate 54 supports the various components of the motion base which are covered by a bellows 56. The bellows prevents contamination or physical interference with the mechanical portions of the seat base and precludes exposure of patrons to the mechanical operations of the seat base as a safety measure. The components of the motion base are shown in FIG. 2b. Three hydraulic actuators 34a, 34b, and 34c, are attached to the base plate and the frame supporting the seats. The three actuators as shown in combination provide motion about two axes of rotation, pitch and roll, and one translation direction, z. The fourth actuator 34d, not shown, may be employed to provide rotation about a third axis, yaw, or an additional translation motion.

The hydraulic system or Hydraulic Power Unit (HPU) of the embodiment shown includes a hydraulic pump 60 driven by an electric motor 62. An accumulator 64 provides energy storage and surge control. A manifold 66 connects the hydraulic pump to the control valves 36a through 36c (and 36d, not shown, if required), and a cylinder unlock valve 68 and pump load valve 70 which will be described in greater detail subsequently. The motion base controller 28 is mounted to the base plate for electrical connection to the valve solenoids and various sensors of the system. Hydraulic fluid for the system is drawn from a reservoir 72 by the pump and is returned to the reservoir from the manifold through a filter 74.

Interconnection of the hydraulic components is shown schematically in FIG. 3. Hydraulic fluid is drawn from the reservoir by the pump and provided through a pulse damper 76 to the manifold. The pump load valve allows selection of the fluid path through the manifold for direct return through the filter to the reservoir allowing the pump to remain running in the no-load condition. When actuated, the pump load valve provides pressure from the pump through the actuator control valves 36a through 36d to the hydraulic actuators. The cylinder unlock valve locks the cylinders of the actuators in a fixed position during loading and unloading of patrons in the seats on the motion base. A pressure-actuated valve 78 is provided to prevent backfeeding of the pump from the accumulator when the pump motor is not operating. Check valves 80 are positioned in the system, as known to those skilled in the art, to preclude reverse fluid flow in the hydraulic system. Position indicators 82a through 82d are attached to actuators 34a through 34d respectively. The position indicators provide feedback to the motion base controller, as will be described in greater detail subsequently. Feedback control in this manner allows the use of standard proportional valves in the system, as opposed to complex hydraulic servo valves.

Figure 4:
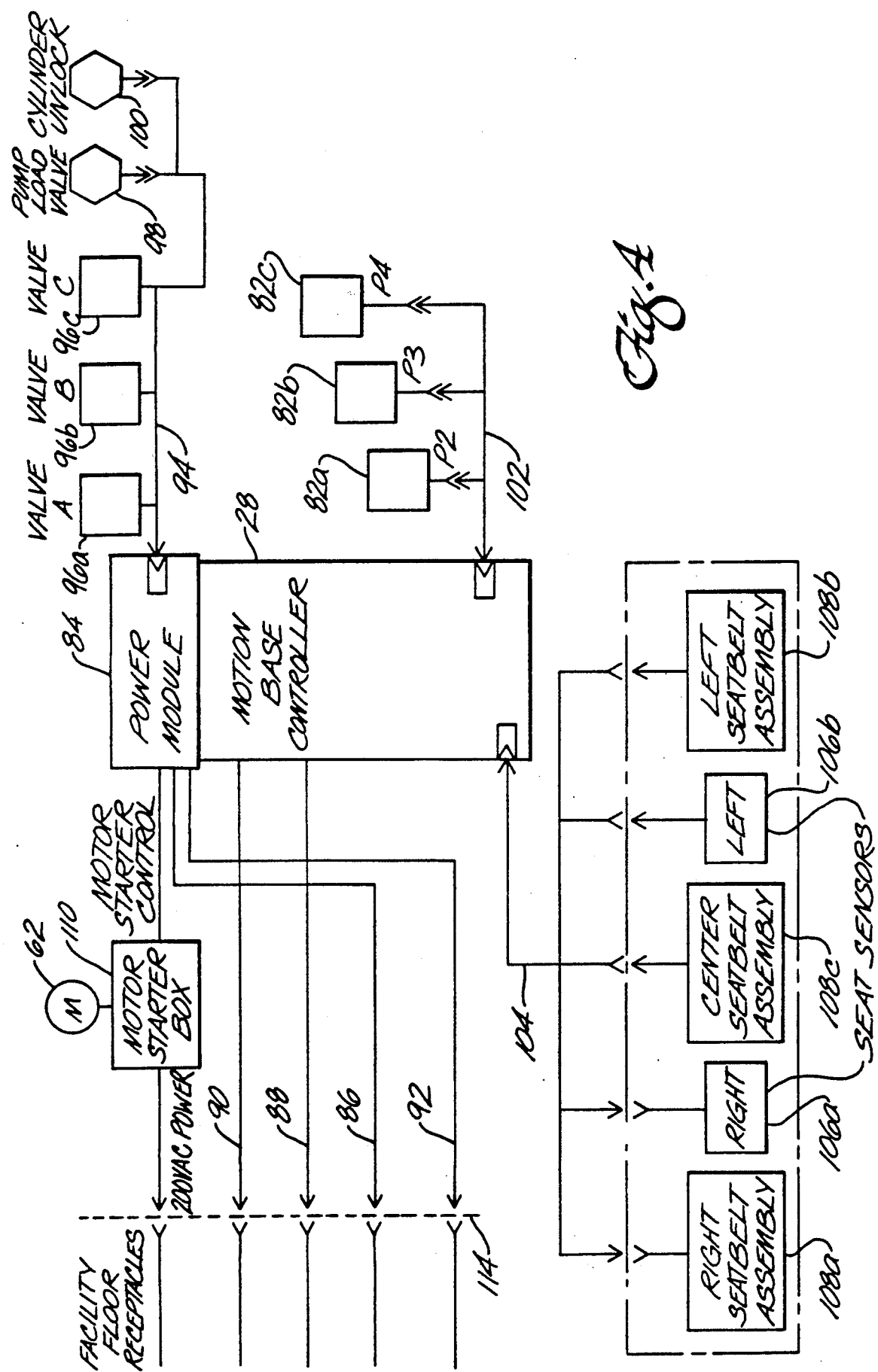
FIG. 4 is a control schematic for the motion base demonstrating the seat safety system and actuation means controls.

Electrical connection of components in the motion base is shown in FIG. 4. The motion base controller includes a power module 84 to condition and distribute power to the electrical elements of the invention. In the present embodiment, 100 volt AC facility power is provided through cable 86 for conversion to 24 volts DC in the power module, as will be described in greater detail subsequently. 100 volt AC power for conversion to 5 volts DC for logic circuit power is provided on cable 88 directly to the motion base controller. Communications and enabling circuitry are connected from the motion base controller to the central controller on cable 90. The emergency stop (ESTOP) chain connection, to be described in greater detail subsequently, is provided to the power module on cable 92. Cable 94 provides power from the power module to solenoids 96a through 96c for hydraulic valves a, b and c, respectively. (A solenoid for the fourth control valve d, is added to this cable when appropriate.) Power to the pump load valve solenoid 98 and cylinder unlock valve, solenoid 100, are also provided through cable 94. Cable 102 provides 5 volt DC power from the logic of the motion base controller to position indicators 82a through 82c (a position indicator for the fourth valve 82d is not shown).

Power for the seat safety systems is provided through cable 104 to seat sensors 106a and 106b. Seat belt assemblies, which will be described in greater detail subsequently, are employed in combination with the seat sensors to constitute the safety systems for patrons occupying the seats, as previously described. A right seat belt assembly 108a and left seat belt assembly 108b provide elements of the seat belts for the right and left respectively, while a center seat belt assembly 108c combines mating elements for both the right seat and left seat.

In the embodiment shown, a motor starter box 110 is required to initially energize the electric motor driving the hydraulic pump. Control of the motor starter is provided from the power module and three-phase 200 volt AC power is provided directly to the motor starter, as known to those skilled in the art. Voltage values employed in the embodiment described have been selected for commonality with existing commercially available componentry. Those skilled in the art will recognize alterations of voltages and connection techniques previously and subsequently described for altering the invention to meet specific needs.

FIG. 5 demonstrates the general arrangement of the current embodiment to be employed in a standard theater environment. The host cabinet 8 is typically installed in a projection booth 111 for coordinated operation with the projection and audio systems providing the visual and sound portions of the experience. In the theater area 112, a screen and sound system (not shown) are provided for the visual and audio portions of the experience. A plurality of motion bases are placed in the theater. Two motion bases are shown in FIG. 5 for explanation of facility interconnection. In the embodiment shown in FIG. 5, floor receptacles 114 are provided for interconnection of the various cables interfacing the motion bases as described with respect to FIG. 4 to the centralized control functions of the host cabinet and facility power.

To ensure positive control of all aspects of the motion system, power for control circuitry is provided through an uninterruptible power supply (UPS) 11 which is shown in FIG. 1. 100 volt AC power from the UPS is distributed to the motion bases and the host cabinet. For connection simplicity a communication "J" box 116 is provided in the theater area for cable connection to the various floor receptacles for the motion bases. Communications and enable signals provided to each motion base on cable 90 are pigtailed as shown in the present embodiment providing communications interface 90a which is serially continued to each motion base and enable lines 90b which are specific to each motion base.

A safety feature of the present invention is its emergency stop capability. A fault condition in any of the motion bases which is detected by the motion base controller will result in an emergency stop of the motion system. As previously described with respect to the operator consoles, the operator may manually initiate an emergency stop for conditions not detected by the system automatically. In the present embodiment the ESTOP system is integral in the power distribution system. An ESTOP box 118 provides a distribution point for the 100 volt AC power provided to the power modules in each motion base. This AC power is distributed only to the 24 VDC power supplies in the various motion base controllers. Within each motion base controller the emergency stop bus (the nomenclature for the emergency stop distribution system) provides the local distribution of power. This 24 volt power is the only electrical power used to energize the solenoids of the actuator valves. The ESTOP box provides the central distribution point for the 100 volt AC power provided on cables 86 as described with respect to FIG. 4. Additionally, the ESTOP chain connection carried by cables 88 as described with respect to FIG. 4 is initiated at the ESTOP box and carried to the power module of each motion base as shown in FIG. 5. Operation of these elements will be described in greater detail subsequently.

Centralized control of the motion system is provided through the host cabinet as previously described with respect to FIG. 1. As shown in FIG. 5, the central controller 20 may comprise a standard microcomputer such as a PC-AT (IBM trademark) or equivalent. The playback system 22 which provides the position data for distribution to the motion bases comprises an animation control unit produced by Anitech Systems, or an equivalent, in the present embodiment. The playback system recalls a preprogrammed motion plan from digital memory to provide four position reference signals to the distribution system. The frame rate of playback is slaved to signals from the projection system to synchronize motion with the visual presentation. The signal system for motion control may be exemplified by a 30-frame per second nondrop SMPTE longitudinal time code or similar signal pattern. As shown in FIG. 5, this input is provided to the animation control unit (ACU) on lines 120. The ACU provides signals to the central controller on lines 122 and to the data distribution unit on lines 124. The central controller communicates with the data distribution unit on lines 126.

Communications with the motion based controllers is accomplished digitally through a serial interface. In the embodiment shown, a standard RS 485 serial interface is connected on lines 128 through the communications "J" box to the motion base controllers. The serial communication is bidirectional providing initialization instructions and position data to the motion bases and receiving status information from the motion bases regarding activation and seat safety systems.

Details of the motion base controller and the associated actuation and safety systems in the motion base are best seen in FIGS. 6a and 6b.

In the present embodiment the heart of the motion base controller is a microprocessor 130. An Intel 80C196 or similar microprocessor may be employed. Memory support for the microprocessor is provided through an 8K RAM 132, a 32K EPROM 134, and a 2K EEPROM 136 with standard data and address functions. Those skilled in the art will recognize alternate approaches for memory support depending on the specific circumstances. As previously described, position information is communicated to the motion base controller through the RS485 serial link 128. A standard serial interface 138 receives data communication from the serial link providing it to the microprocessor. In the embodiment shown the microprocessor encodes the position data using pulse width modulation (PWM). PWM signal buffering 140 receives the PWM drive data from the microprocessor and provides it to solenoid drive transistors 142 located in the power module. The solenoid drive transistors in turn provide the appropriate voltage to the proportional valve solenoids to position each solenoid. Closed loop control of proportional valves is accomplished through the use of the feedback sensors 82 connected to the actuators.

Figure 7:
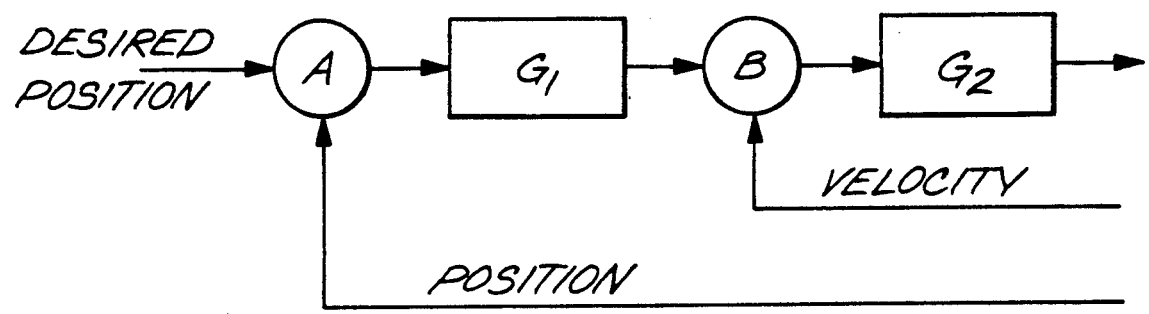
FIG. 7 is a control transfer function diagram.

In the present embodiment the feedback sensors are potentiometers which provide a signal through feedback buffer filters 151 through an analog digital converter to the microprocessor. Additionally, the signal is provided from the feedback buffers to differentiators 152 to provide a velocity signal which is provided through analog the digital convertors to the microprocessor. The combination of position and velocity are employed in a motion control sequence to alter the PWM signal as appropriate to achieve the desired position. An example control transfer function is shown in FIG. 7 wherein the desired position received from the communication serial link is summed with the current actuator position in summer A operated on by a transfer function G1 to establish an adjustment for true 0. The output of G1 is summed with the velocity in summer B and provided through a transfer function G2 to establish the appropriate PWM signal to control the respective valve.

As previously described the use of simple proportional hydraulic valves is enabled using this technique. PWM is a technique that produces an analog output from the digitally communicated position data. The analog output is proportional to the amount of time the output signal is turned on. For example, in the present system using a 24 volt DC signal, if the signal is turned on for one count and off for nine counts and this cycle is repeated, the average voltage level of the repeating signal as seen by an external analog device is ten percent of 24 volts DC or 2.4 volts DC. This assumes that the analog device is too slow to track the individual counts of the PWM. In the present invention the PWM is operated at high frequency beyond the response bandwidth of the proportional valve solenoids. Further the PWM signal buffering and solenoid drive transistors are designed to transmit the averaged signal to the valve solenoids.

The microcontroller also controls the pump load valve and cylinder unlock valves during initialization of the motion base for motion. The microprocessor communicates through a pump load digital drive buffer 144 to control solenoid drive transistors 146 in the power module which provide power to the pump load valve solenoid. Similarly, the microprocessor communicates through a cylinder unlock digital drive buffer 148 to drive solenoid drive transistors 150 on the power module to provide power to the cylinder unlock solenoid.

The seat safety system is monitored and controlled by the microprocessor. When a patron is seated the seat sensor 106 detects the presence of the patron. Guest sensor circuitry 153 in FIG. 6B interfaces with the seat sensor to provide information to the microprocessor that patron is present. If a patron is present in the seat, the safety system requires that the seat belt be connected prior to initiation of motion for the safety of the patron. In addition, the invention prevents the intentional or inadvertent release of the seat belt when the motion base is in motion by locking the seat belt latch to prevent unlatching and by locking the seat belt reel to maintain the belt in a tightened condition. In the present embodiment this is accomplished through a series of solenoids and status switches 154. A status switch is provided for each seat belt indicating whether the seat belt has been latched. A second switch is provided for each belt designating whether the seat belt latch lock is engaged and a third switch on each belt is provided to designate whether the seat belt reel is locked. The state of the status switches is transmitted through a seat belt status signal buffer 156 to the microcontroller. The seat belts switches are separately powered by 5 volts DC. When the seat sensor indicates that a patron has been seated in the seat and the seat belt latch status switch indicates the seat belt has been fastened, the microprocessor provides a signal through the seat belt latch unlock solenoid drive transistor 158 to the seat belt latch unlock solenoid 160 which engages preventing the latch from being unlocked during motion of the ride. Similarly, the microprocessor communicates through seat belt reel unlock solenoid drive transistors 162 to the seat belt reel unlock solenoids 164 preventing rotation of the reel and consequent loosening of the seat belt. These safety features provide positive assurance of the safety of a patron during ride motion. Those skilled in the art will recognize potential additions to this system including seat belt reel position sensors which would sense reel position to verify that the seat belt was in fact fastened over a patron's lap as opposed to fastened under the patron while the patron is seated on top of the belt. Similar control may be obtained through timing of the microprocessor actions whereby a fastened seat belt indication from the seat belt status switches prior to an indication of a patron present in the seat from the seat sensor will result in an error condition in the microprocessor preventing motion from being initiated.

In addition, the seat belt status from switches 154 is provided by the microprocessor through the RS485 serial link to the central controller. The central controller in turn provides the status information to the theater chair functions portion of the operator console as described with respect to FIG. 1. The status indicators for each motion base indicate the presence or absence of patrons in the seats on the motion base and the status of their seat belts. In the present embodiment operation of the ride may only be initiated through verification by the operator that all occupied seats have seat belts properly fastened through movement of the seat status switch to a "belts checked" position.

As previously described, the emergency stop system is employed in the present invention to preclude motion in the motion bases if any unsafe condition exists. The architecture for implementing this function is shown in FIGS. 6A and 6B. Placing of the seat status switch at the operator console in the belts checked position provides a signal on line 166 to the ESTOP & Enable Circuit 168 in the power module. As previously described 100 volt AC power from the ESTOP system bus is provided to the ESTOP & Enable Circuit. A 24 volt DC power supply 170 converts the 100 volt AC to 24 volt DC power for use within the motion base. Once the belts checked status has been received from the operator console through the host cabinet, 24 volts DC is provided on line 172 which supplies all 24 volt sources as shown in FIG. 6A. Operation of each of the 24 volt components is accomplished by switching to a 24 volt DC return by the appropriate drive transistors. If an ESTOP condition is encountered relays in the ESTOP & Enable Circuit disable the 24 volt output on line 172 thereby preventing any motion in the actuators of motion base. Communications between the ESTOP & Enable Circuit and the microprocessor in the motion base controller is accomplished through ESTOP & Enable Signal Buffers 174. Communication of the belts checked status and local ESTOP status from the ESTOP & Enable Circuit verifies the status of the individual motion base. If the microprocessor in the motion base controller executes a local ESTOP the command signal is provided through the ESTOP & Enable Buffers to the ESTOP & Enable Circuit.

An ESTOP initiated by one of the motion base controllers is the result of a vote for system ESTOP provided by the microprocessor through the ESTOP & Enable Signal Buffers to a solid state relay 176 which is transmitted to the ESTOP box 118 of FIG. 5. This action is known as "pulling down the ESTOP bus". Since the 100 volt power on the ESTOP bus is daisy chained between each motion base any motion base pulling down the ESTOP bus breaks the circuit withdrawing ESTOP power from all motion basis. An ESTOP initiated by another motion base is reflected through the ESTOP & Enable Circuit as a system ESTOP to the microprocessor via the ESTOP & Enable Signal Buffers.

As previously described power from the UPS is provide to each motion base controller and is converted by power supplies 178 to appropriate logic circuit voltages of plus 5 volts DC, common, and minus 5 volts DC, nominal.

Starting control for the electric motor driving the hydraulic pump is accomplished as previously described on command of the microprocessor. Initiation of the motor starter is provided by the microprocessor through a pump power disconnect driver 179 to a solid state relay 180 in the power module which drives the coil 182 of the motor starter. As previously described 200 volt three phase power is provided to the motor starter. Auxiliary contacts 184 provide a signal through relay 186 in the power module to motor starter monitor signal buffering 188 which provides a digital input to the microprocessor. Those skilled in the art will recognize proper sequencing and control for starting of the electric motor.

Figure 8:
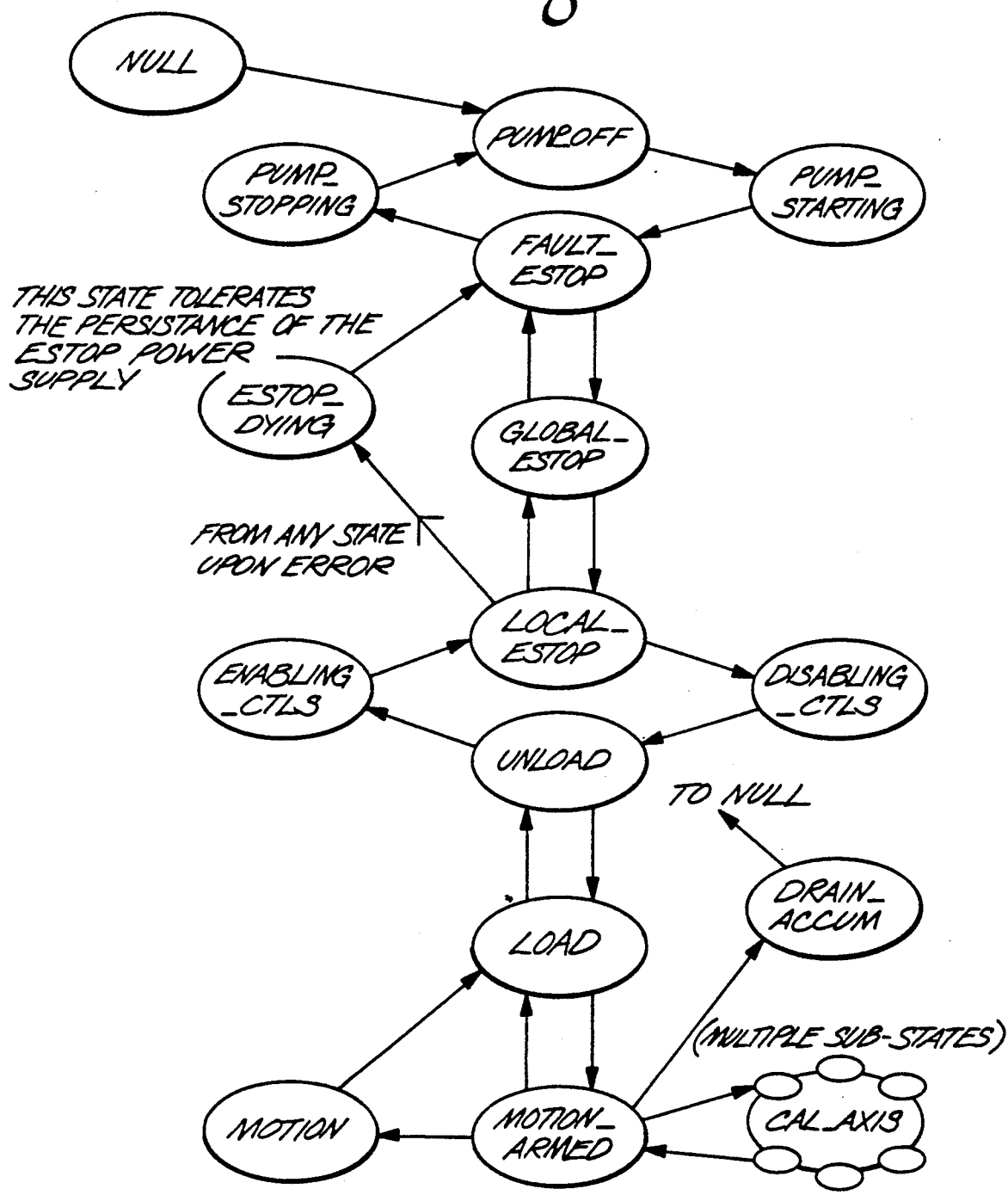
FIG. 8 is a state diagram for the micro-processor control of the motion base system.

Control of the various events and systems previously described may be exemplified by the state diagram shown in FIG. 8. The microprocessor initially resides in the NULL state. Upon power up and initialization by the central controller each motion base is in an unstarted state. This state is reflected by the PUMP OFF state which is the equivalent of an idle state. Upon command from the central controller the microprocessor will initiate the pump motor starter and reside in a state PUMP STARTING. Confirmation that the pump has started transitions the microprocessor to the next state. A time out timer is also present on this state which if exceeded prior to receiving confirmation of PUMP START indicates a failure of the pump. The microprocessor next transitions to the FAULT ESTOP state which results when the pump is on but the motion base is voting for ESTOP thereby causing ESTOP power to be cutoff. Once the microprocessor has verified status of the system and withdrawn the vote for ESTOP, the microprocessor resides in the GLOBAL ESTOP state indicating the pump in the motion base is on. The motion base is not voting for ESTOP but ESTOP power has not yet been distributed to this motion base. An example of this state would be an activation of the manual ESTOP on the operator control console. When ESTOP power is distributed to the motion base the microprocessor transitions to a LOCAL ESTOP state wherein the microprocessor has now assumed control of power from the ESTOP bus but has not activated 24 volt DC power through the ESTOP and Enable Circuit. When the microprocessor switches on ESTOP power an intermediate state DISABLING CTLS is entered between the attempt and confirmation of switching power onto the LOCAL ESTOP bus. This state contains a timeout timer which if expired prior to confirmation on the bus through the LOCAL ESTOP status reporting to the microprocessor indicates a failure of the local ESTOP relay 176. Upon successfully establishing ESTOP power to the motion base the microprocessor resides in the UNLOAD state. Upon command from the central controller the microprocessor enters the LOAD state.

Figure 9:
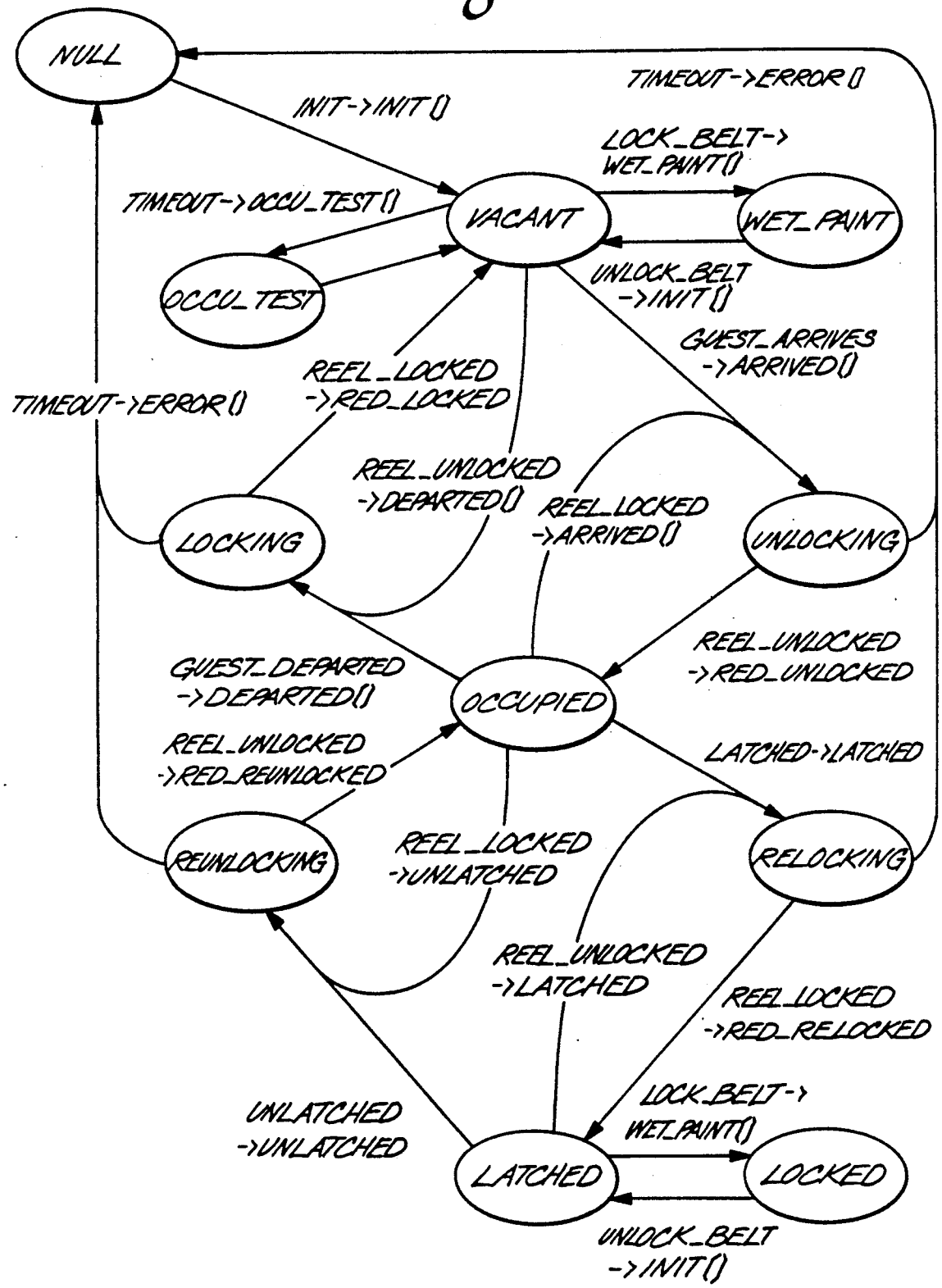
FIG. 9 is a state diagram for the micro-processor control of the seat safety system.

A series of states in the microprocessor designated the Seat Belt Manager is shown in FIG. 9. These states allow the microprocessor to monitor loading of patrons onto seats in the ride prior to initiation of the ride by the operator. The initial state of the seat belt manager is VACANT signifying the seat is empty, the belt is unlatched and the reel is locked. When a patron occupies the seat a GUEST ARRIVES signal is generated into the microprocessor in response to the seat sensor activation. The microprocessor then enters the UNLOCKING state which unlocks the seat belt reel in preparation for the patron to fasten the seat belt. A REEL UNLOCKED signal is received by the microprocessor which then transitions to the OCCUPIED state signifying a presence of a patron in the seat with the reel unlocked to allow use of the seat belt and the seat belt has not yet been latched. When the patron latches the seat belt the LATCHED signal reflected by the seat belt status switch transitions the microprocessor into the RELOCKING state wherein the microprocessor again locks the seat belt reel. Upon receiving the REEL LOCKED signal signifying that the seat belt reel has been relocked the microprocessor transitions to the LATCHED state. In this state the reel has again been locked to secure the guest. However, the belt can be unlatched without creating an error. If the patron unlatches the seat belt the UNLATCHED signal from the seat belt status switches is received by the microprocessor thereby transitioning to the REUNLOCKING state wherein the microprocessor unlocks the reel and returns to the occupied state. Additionally, from the OCCUPIED state should the REEL LOCKED signal be received by the microprocessor the REUNLOCKING state will again be entered to unlock the reel. Returning again to the LATCHED state with the patron seated and belted in from the LATCHED state the microprocessor issues the signals to lock the seat belt latch preventing the patron from unlatching the belt. Upon receiving the LOCK BELT signal from the seat belt status switches the microprocessor enters the LOCKED state. In this state the patron is prepared for the ride, and the motion base may continue preparation to begin motion.

To verify that a seat on the motion base remains vacant the microprocessor monitors each seat on a timeout basis and executes a test of the seat sensor to verify that no patron is present through the OCCU TEST state. If both seats on the motion base remain vacant the microprocessor will not activate motion of the motion base. A condition for preventing patrons from occupying a seat is provided through applying a LOCK BELT signal by the microprocessor to enter a state defined as WET PAINT. This state allows a single seat on the motion base to be taken out of service without requiring that the motion base itself be taken out of service. A guest sitting in the seat for which the microprocessor is in the WET PAINT state will result in an error condition preventing activation of motion. The seat may be removed from the WET PAINT state by issuing the UNLOCK BELT command by the microprocessor to return to the VACANT state.

Returning to FIG. 8 the microprocessor after completing the previous steps in the seat belt manager for both seats on the motion base may enter the MOTION ARMED state when directed to do so by the central controller.

Upon command from the central controller the motion base controller enters the MOTION state which results in opening of the pump load and cylinder unlock valves. Position data is provided from the animation control unit to the central processor synchronized with the visual and audio portions of the experience. The central controller then transmits position data through the RS 485 serial interface to the motion basis. In the MOTION state the microcontroller directs motion of the hydraulic actuators through PWM control of the valve solenoids. Upon completion of the motion sequence the central controller commands the microprocessor to terminate the sequence the microprocessor proceeds to the LOAD state and the UNLOAD state. In the UNLOAD state the seat belt manager is again activated as shown in FIG. 9 to unlock the seat belt latch returning this system to the LATCHED state. Upon unlatching of the seat belt by the patron the microprocessor receives the UNLATCHED signal from the seat belt status switches and enters the REUNLOCKING state. The microprocessor unlocks the seat belt reel to allow retraction of the seat belt and after receiving the REEL UNLOCKED signal returns to the OCCUPIED state. When the patron exits the seat thereby deactivating the seat sensor, a GUEST DEPARTED signal is received by the microprocessor thereby transitioning the system to the LOCKING state to lock the reel in the retracted position. Upon receipt of the microprocessor of the REEL LOCKED signal the system returns to the VACANT state. Timeout conditions in the LOCKING, UNLOCKING, RELOCKING and REUNLOCKING states are provided to determine an error state if the system malfunctions. Once the patron has unloaded from the seat the motion base system and central controller are again in a position to begin the ride with the system in the UNLOAD state.

If operations for the day are complete and system shut down is required the microprocessor upon control of the central controller will disable the LOCAL ESTOP bus resulting in a transition to the ENABLING CTLS state as a transition until the LOCAL ESTOP state is reached. The reverse sequence of ESTOP states is performed by the microprocessor as was performed in the system start until the FAULT ESTOP state is reached upon which the pump motor is turned off placing the microprocessor in the PUMP STOPPING state as an interim until verification that the pump has in fact stopped operation at which time the microprocessor transitions to the PUMP OFF state.

For an error condition in any of the operating states UNLOAD, LOAD, MOTION ARMED or MOTION, the error condition will place the microprocessor in the ESTOP DYING state as the ESTOP system is activated. This interim state is used between the attempt to cut ESTOP power with the ESTOP vote and the confirmation of loss of ESTOP power by the microprocessor. Upon confirmation of the ESTOP power being removed the microprocessor enters the FAULT ESTOP state wherein power is withdrawn from the valve solenoids as previously described preventing any motion and allowing the motion base to settle. Required maintenance or other repair to correct the fault condition is then required prior to returning the system to service.

The system also provides various maintenance capabilities, for example, from the MOTION ARMED state the microprocessor can be directed to drain the accumulator in the hydraulic system and enters the DRAIN ACCUM state. This is a timed state used to drain the accumulator by manipulating the main hydraulic valves. A timeout of this state places the microprocessor in the PUMP OFF state. Similarly, from the MOTION ARMED state calibrations can be conducted of one or more of the hydraulic actuators. Typically this is accomplished under local control with the microprocessor in a CAL AXIS state which contains multiple sub-states for controlled motion of the actuators.

Those skilled in the art will recognize additional control requirements for the microprocessor to interface with the components of the motion base system and with the central controller. Interrupt communications protocols and other standard techniques may be employed for communication and control by the central controller and microprocessor.

Basic operation of the overall theater system incorporating the motion base, closed cabinet and standard theater system functions may be summarized as follows:

The theater operator positioned at the operator's console will control opening of the entry doors to an empty or unloading theater. All of the seat status indicators on the operator's console will indicate availability since no patrons are present in the seats. As patrons occupy the seats the seat status indicators will demonstrate that the seats are occupied and when the seat belts are fastened will indicated that the seat belts are latched. With the majority of guests seated the operator will look to the console to determine which seats indicate unfastened seat belts or vacancy to direct fastening of seat belts by occupants in seats and direct other patrons to open seating. Once all patrons have entered the theater and the seats are full the entry doors will be closed and all seats should indicate vacant or a patron present with a seat belt latched. When the operator has determined from the seat status indicators that all seat belts are latched the seat status control will be switched to the "belts checked" position. The show control switch will then be activated by the operator beginning the projection and audio sequence. The central controller and playback subsystem (animation control unit) will initiate the motion portion of the experience synchronized to the projection as previously described.

Should a guest have difficulties or a technical problem which is not automatically detected occur the operator may decide to terminate motion in the system by activating the emergency stop (ESTOP) on the operator console. As previously described, activation of the ESTOP will cause the seats to settle, stopping motion. As an alternative, a show stop control may be provided which stops not only motion but the projection and audio portions of the program as well.

At a normal completion of the experience the operator will return the seat status switch to the load condition (out of the "belts checked" position). The motion bases will be in the UNLOAD state allowing patrons to unlatch their seat belts and depart from the ride. As previously described, the cylinder unlock valve will be engaged preventing movement of the cylinders to allow safe egress from the seats. This sequence will then be repeated for the next show as required.

Operation of other functions of the theater system including the house lights, stair lights, exit signs and public address audio may be operated manually or automatically depending on system constraints and design.

At the conclusion of the last show of the day the operator places the console controls in a disabled state causing the central control system to direct the motion base controllers to shut down entering the PUMP OFF state as previously described.

The details of the present invention have been described as required by the patent statutes. Those skilled in the art will recognize numerous modifications or alterations to the system to accommodate specific operational requirements. Such modifications and alterations are within the intent and scope of the invention as defined in the following claims.

What is claimed is:

1. A motion seat base for use in combination with a visual presentation for increased realism in an entertainment experience comprising:
   a frame for supporting at least one seat;
   a plurality of actuating means which are independently positionable for imparting motion to the frame;
   a means for providing actuation signals syncronized with the visual presentation;
   a control means connected to the actuating means and responsive to the actuation signal providing means for controlling the position of each of the actuating means to impart motion;

a position sensing means connected to each actuating means for sensing the position of the actuating means and providing a feedback to the control means; and, a safety system connected to the seat and the control means for deactivating the actuating means if an unsafe condition exists.

2. A motion seat base as defined in claim 1 wherein the safety system comprises:

a seat belt system located at each seat and having a latch for connection to secure a seatbelt;

means for detecting a patron seated in the seat; and, means for sensing when the latch is connected; and wherein the control means includes:

means for comparing the detecting means and the sensing means to verify that when a patron is seated and the latch is connected; and, means for disabling motion of the actuation means responsive to the comparing means.

3. A motion seat base as defined in claim 2 wherein the seat belt system further comprises means for locking the latch once connected to prevent disconnection by the patron.

4. A motion seat base as defined in claim 3 wherein the seat belt system further comprises a means for tensioning the seat belt to retract the seat belt when unlatched and maintain a tight fit across the patron's lap when latched, and means for locking the tensioning means.

5. A motion seat base as defined in claim 4 wherein the seat belt system further comprises means for indicating that the latch locking means is locked.

6. A motion seat base as defined in claim 5 wherein the control means further comprises means for energizing the latch locking means, and wherein the control means is responsive to the latch lock indicating means to prevent the actuating means from producing motion when the latch is not locked.

7. A motion seat base as defined in claim 4 wherein the seat belt system further comprises means for indicating that the tensioning locking means is locked.

8. A motion seat base as defined in claim 7 wherein the control means further comprises means for energizing the tensioning locking means, and wherein the control means is responsive to the tensioning lock indicating means to prevent activation of the actuating means to produce motion when the tensioning means is not locked.

9. A motion seat base as defined in claim 8 wherein the control means is responsive to the detecting means to energize the tensioning locking means when a patron is not present in the seat.

10. A motion seat base as defined in claim 1 wherein the actuating means comprise hydraulic cylinders controlled by solenoid actuated valves and the motion seat base further comprises a self contained hydraulic power unit.

11. A motion seat base as defined in claim 10 wherein the control means includes means for generating a pulse width modulated signal for each solenoid actuated valve responsive to the actuation signal providing means and the solenoid actuated valves are hydraulic solenoid valves.

12. A motion seat base as defined in claim 11 wherein the generating means comprises:

means for receiving the feedback from the position sensing means to determine the actual position of the actuating means;

means for comparing a desired position determined by the actuation signals to the actual position to establish a position difference;

means for calculating the required pulse width modulated signal to achieve the desired position based on the position difference; and, means for transmitting the pulse width modulated signal to the valve solenoids.

13. A motion seat base as defined in claim 12 wherein the control means comprises:

a central controller responsive to an operator console having a manual activation switch, a manual emergency stop switch and means for displaying status of the seat safety system, the central controller further responsive to the actuation signal providing means and providing start, stop, and position signals;

a motion base controller adapted for activating a means for locking a latch for connection to secure a seatbelt and the generating means, and the motion base controller is responsive to a means for detecting a patron seated in the seat, a means for sensing when the latch is connected, a means for indicating that the latch locking means is locked, and the start, stop and position signals; and the motion base controller further providing a seat status signal;

means for communicating the start, stop, and position signals from the central controller to the motion base controller and the seat status signal from the motion base controller to the central controller; and, means for transmitting the seat status signal from the central controller to the seat safety system status displaying means of the operator console.

14. A motion seat base as defined in claim 13 further comprising:

a means for tensioning the seat belt;

a means for locking the tensioning means; and, a means for indicating that the tensioning locking means is locked, wherein the motion base controller is further responsive to the tensioning lock indicating means and adapted for activating the tensioning locking means.

* * * * *

UNITED STATES PATENT AND TRADEMARK OFFICE
CERTIFICATE OF CORRECTION

PATENT NO. : 5,015,933
DATED : May 14, 1991
INVENTOR(S) : W.Watkins; D.Toyne; A.Arena; L.Lawver; D.Birket It is certified that error appears in the above-identified patent and that said Letters Patent is hereby corrected as shown below:

Abstract, line 11, change "threater" to -- theatre --.

Column 3, line 29, change "include" to -- includes --.

Column 15, lines 17 and 18, after "sensing" continue the sentence with "means to verify . . ." without paragraphing.

Signed and Sealed this

Second Day of November, 1993

Attest:

BRUCE LEHMAN

Attesting Officer

Commissioner of Patents and Trademarks